Aug. 12, 1958     J. W. HUFFMAN     2,847,554
ELECTRICAL HEATING APPARATUS
Filed July 5, 1957     2 Sheets-Sheet 1

INVENTOR
JOHN W. HUFFMAN
BY M. C. Freudenberg
ATTORNEY

Aug. 12, 1958     J. W. HUFFMAN     2,847,554
ELECTRICAL HEATING APPARATUS
Filed July 5, 1957     2 Sheets-Sheet 2
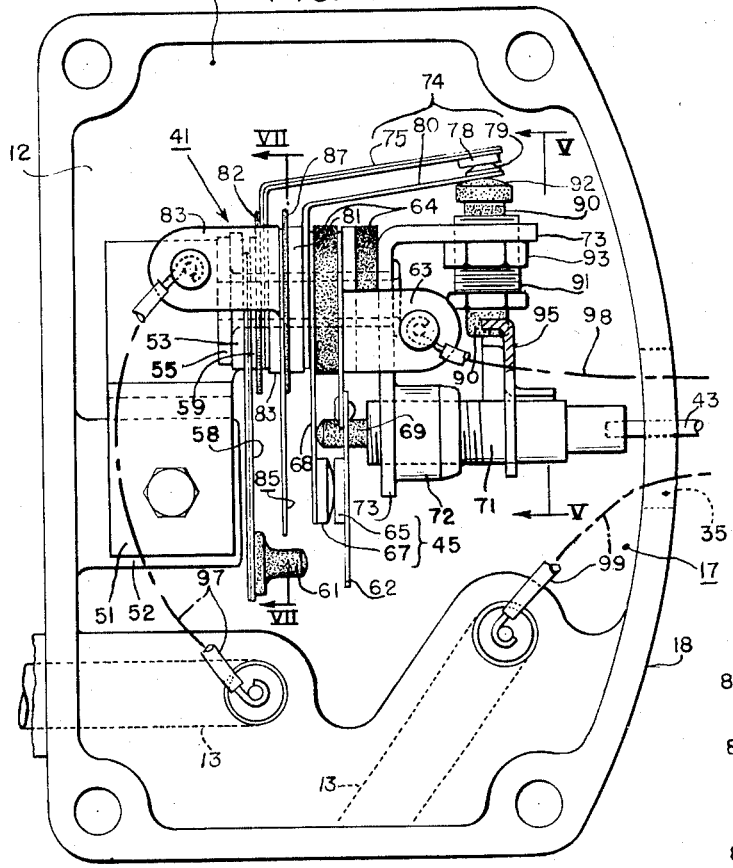
FIG. 4.
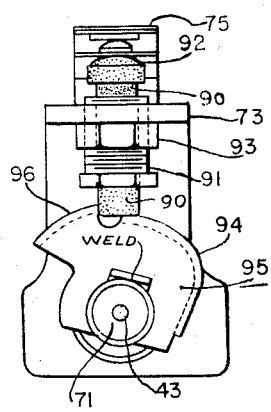
FIG. 5.
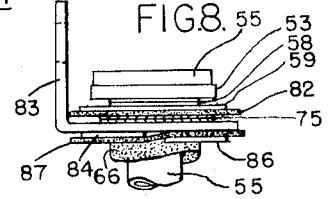
FIG. 8.
FIG. 6.
FIG. 7.
INVENTOR
JOHN W. HUFFMAN
BY M. C. Freudenberg
ATTORNEY United States Patent Office 2,847,554
Patented Aug. 12, 1958

2,847,554

ELECTRICAL HEATING APPARATUS

John W. Huffman, Mansfield, Ohio, assignor to Westinghouse Electric Corporation, East Pittsburgh, Pa., a corporation of Pennsylvania Application July 5, 1957, Serial No. 670,047

12 Claims. (Cl. 219—44)

This invention relates to an improved cooking appliance comprising an electrically heated vessel and more specifically relates to an improved thermostatic control for regulating the heating of said vessel.

One of the objects of this invention is to provide an improved cooking appliance that may be used for performing thermostatically controlled cooking operations at temperatures in the vicinity of the boiling point of water, as well as in temperature ranges both above and below the boiling point of water.

Another object of this invention is to provide an improved control of the above type for regulating the intensity at which water is boiled, the control being also adjustable to regulate temperatures for cooking operations performed above or below boiling.

Another object of this invention is to provide a simplified and inexpensive control of the above-mentioned type.

In accordance with this invention an improved manually adjustable thermostat is disposed in good heat transfer relationship with the bottom wall of an electrically heated cooking vessel to control the temperatures of said vessel. The thermostat comprises a main bimetal responsive to the temperature of the vessel to actuate a first switch controlling energization of the vessel heater to maintain a desired vessel temperature. An auxiliary heater is supported adjacent the main bimetal and is connected in series with the main switch and shunted by an auxiliary switch. The auxiliary switch includes a secondary bimetal, also responsive to the temperature of the vessel, which may, upon heating, open the shunting auxiliary switch at a temperature just below the boiling temperature of water.

The thermostat is manually adjustable through three different ranges, namely, a warming range, a boiling range and a range of temperatures above boiling. In the warming range, the vessel temperature is kept low so that the secondary bimetal is never heated sufficiently to open the switch which shunts the auxiliary heater. The main bimetal operates within this range to actuate the main switch and maintain the vessel at a temperature determined by the manual adjusting means. In the range above boiling, the manual adjusting means mechanically closes the shunting switch so that the secondary bimetal is ineffective to open this switch and, therefore, the main bimetal operates the main switch to regulate the temperature of the vessel as determined by the manual adjusting means.

For adjustments of the manual control in the boiling range, the secondary bimetal, upon being heated to a temperature which is just below boiling, will open the auxiliary switch shunting the auxiliary heater. The auxiliary heater will then supply additional heat to the main bimetal and the latter will be deflected in response to the combined heating effects of the vessel and auxiliary heater to open the main switch. Thereafter, the main bimetal will cyclically open and close the main switch to control the rate of boiling in the vessel.

The foregoing and other objects are effected by the invention as will be apparent from the following description and claims taken in connection with the accompanying drawing, forming a part of this application, in which:

Fig. 4 is an enlarged view of the vessel thermostat in the thermostat chamber on the bottom of the vessel;

Fig. 5 is a view of the thermostat taken on line V—V of Fig. 4, showing the thermostat adjusting screw at its highest heat position;

Fig. 6 is a view similar to Fig. 5, but showing the thermostat adjusted to a low heat or off position;

Fig. 7 is a view of an auxiliary heating structure for the vessel thermostat as seen on line VII—VII of Fig. 4; and Fig. 8 is a view taken on line VIII—VIII of Fig. 7.

Figure 1:
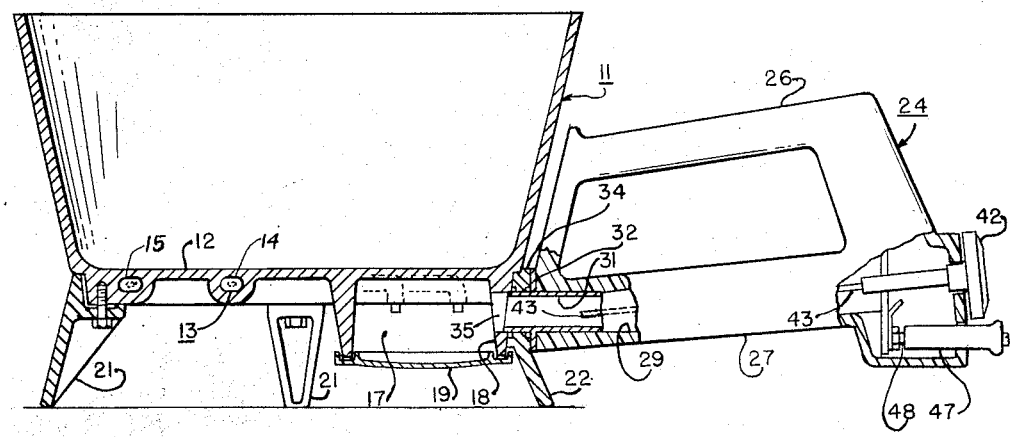
Fig. 1 is a vertical section through a heating vessel showing a thermostat mounting chamber, but with the thermostat omitted.
Figure 2:
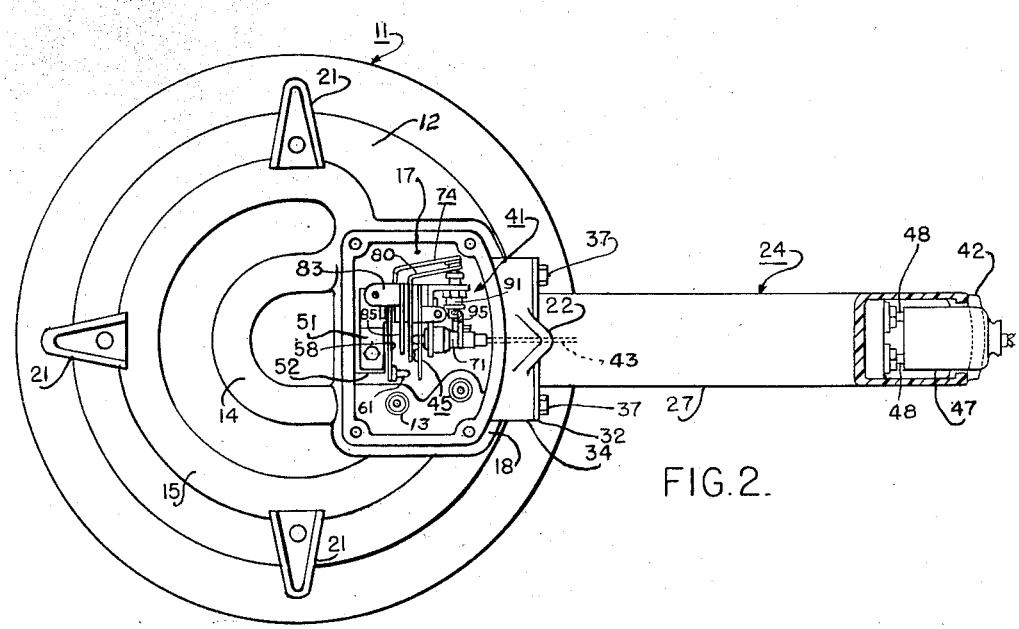
Fig. 2 is a bottom plan of the vessel of Fig. 1 with the cover of the thermostat chamber removed to show the thermostat.

Referring to Figs. 1 and 2, the cooking appliance, shown therein, comprises a metal vessel 11 of cast aluminum, or the like, having a generally flat bottom wall 12 with a sheathed electrical resistance heater 13 cast in the bottom wall. The heater 13 is formed with a curved portion 14 of small radius near the center of the bottom wall 12 and a curved portion 15 of larger radius at least partially encircling the central curved portion 14 to provide more uniform heat distribution to the bottom wall of the vessel. The ends of the heater terminate in a chamber 17 having a generally rectangular side enclosing wall 18 depending from the bottom wall 12 of the vessel. The chamber may be covered and sealed by a plate 19 screwed to the wall 18. The vessel 11 is provided with a plurality of thermally insulating feet 21 and 22 for support above any flat horizontal surface.

A handle 24 is attached to the vessel 11 adjacent the chamber and extends horizontally therefrom. The handle 24 has a pair of parallel vertically spaced horizontally extending grips 26 and 27 which are joined at their opposite ends. The lower grip 27 of the handle has a passage 29 extending therethrough. Secured in one end of the passage 29 during the molding of the handle, is a tubular metal member 31 which extends outwardly from the handle in substantial alignment with the passage 29 therein. The tubular member 31 has an integrally formed, outwardly extending plate or flange 32 intermediate its ends. This plate 32 extends beyond the handle 24 on both sides thereof. The tubular member extends through a hole in a generally rectangular, thermally insulating spacing member 34 and into a hole 35 in the wall 18 of the chamber 17. The foot 22 depends from the spacing member 34 and is molded integrally therewith from a suitable plastic or phenolic material. The opposite faces of the spacing member 34 are provided with recesses encircling the hole therein to provide seats for heat resistant silicone rubber O-ring seals (not shown). Screws 37 extend through the plate 32 and spacing member 34 into the wall 18 on opposite sides of the handle 24 to secure the latter to the wall 18 in sealed relationship therewith.

Figure 3:
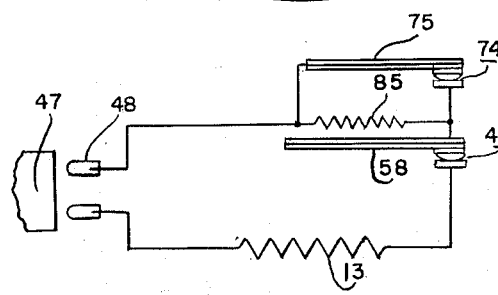
Fig. 3 is a schematic circuit of the main heater for the vessel of Figs. 1 and 2 and the thermostatic control therefor.

A manually adjustable thermostat 41 is mounted within the chamber 17 in good heat transfer relationship with the bottom wall 12 of the vessel 11. A manually adjustable control knob 42, rotatably supported at the outer end of the handle 24, is connected to the thermostat 41 for adjusting the latter by means of a flexible wire coupling 43 extending through the passage 29 and through the tubular member 31. The thermostat 41 includes a main thermally actuated switch 45 connected by suitable electrical leads to control energization of the heater 13 from an electrical power source. The electrical leads are indicated in the schematic circuit of Fig. 3 and in Fig. 4, but are omitted from Fig. 2 for the sake of clarity. The appliance may be connected to the power source by means of a conventional appliance cord and having a female receptacle 47 inserted in the outer end of the handle 24 to engage a pair of male electrical terminals 48 therein.

The thermostat 41 is supported in the chamber 17 at the bottom of the cooking vessel 11 by means of a metal heat conducting bracket 51 secured by a screw to a projection 52 formed integrally with the vessel wall 12. The supporting bracket 51 has a flange 53 extending generally normal to the bottom of the vessel. The flange 53 is the first in a stack of thermostat components that are clamped together by a mounting sleeve 55 extending through each of the stacked components and headed at each end. A main bimetal strip 58 has one end fixed in the stack between a metal washer 59 and the flange 53 on the supporting bracket, the bimetal 58 being in good heat conducting relationship with the bracket. The other end of the bimetal is free to deflect in response to changes in temperature thereof and carries on its low expansion face an electrically insulating ceramic pin 61. The pin 61 is engageable with one end of an electrically conducting spring arm 62 which has its other end secured in contact with an electrically conductive terminal member 63 between a pair of electrically insulating ceramic washers 64 in the switch stack. Insulating means, such as a ceramic sleeve 66, shown in Figs. 7 and 8, is provided along the outer surface of the metal mounting sleeve 55 to keep the electrically energized switch components separate therefrom. The spring arm 62 has welded thereto, adjacent its movable end, one contact 65 of the main switch 45. The other contact 67 of switch 45 is welded on the end of an adjustable electrically conducting spring arm 68, the other end of which is clamped in the stack. The arm 68 is biased into engagement with an insulating pin 69 projecting from the end of an adjusting screw 71 that is threaded in a fixed sleeve 72. The sleeve 72 is carried by an L-shaped bracket 73 also secured in the stack of thermostat components. The adjusting screw 71 may be rotated to shift the pin 69 axially and change the temperature to which the main bimetal 68 must be heated to effect separation of the contacts 65 and 67 of switch 45.

The thermostat 41 also includes an auxiliary thermostatic switch 74, comprising an L-shaped, thermally responsive bimetal strip 75. One leg of the latter is secured in the thermostat stack and its other leg carries one contact 78 of the switch 74. The other contact 79 of the switch 74 is welded on the end of one leg of an L-shaped electrically conducting spring 80. The other leg of the spring 80 is clamped between and welded to a metal washer 81 and the fixed end of the spring arm 68.

The fixed end of the L-shaped bimetal 75 is electrically insulated from the metal washer 59 and bimetal 58 by a mica washer 82 and is welded to one face of the flat portion of an electrical terminal member 83 that is clamped in the thermostat stack. One end 84 of a U-shaped auxiliary low wattage heater 85 is spot welded to the other face of the clamped portion of terminal member 83. The ends 84 and 86 of the U-shaped heater are clamped in the stack on opposite sides of the clamping sleeve 55 and are separated and slightly offset axially of the sleeve by means of a thin electrically insulating mica washer 87 as seen in Figs. 7 and 8. The other end 86 of the U-shaped heater is clamped in electrical contact with the metal washer 81 to which the fixed ends of the spring arm 68 and the L-shaped spring member 80 are welded. Thus, the switch 74 is connected in shunt with the heater 85. The heater 85 extends from the stack opposite the low expansion side of the main bimetal 58 and is disposed to heat the latter when the heater 85 is energized. The ceramic pin 61 has a shouldered base engageable with the outer end of the heater 85 to prevent the latter from electrically contacting the bimetal 58 as it deflects upon being heated.

The L-shaped bimetal 75 is arranged so that, upon being heated, its free end deflects away from the L-shaped spring arm 80 to separate the contacts 78 and 79 when the arm 80 is in the position shown in Fig. 6. The arm 80 is biased into engagement with the end of an electrically insulating ceramic pin 90 that is slidable axially of itself, but normal to the axis of the adjusting screw 71, in an adjusting sleeve 91 threaded in the L-shaped bracket 73. The pin 90 has an enlarged head 92 engageable with the end of the sleeve 91 to limit movement of the pin in the direction in which it is biased by the arm 80. The pin 90 is shown in this limit position in Fig. 6. The sleeve 91 may be rotated in the L-shaped bracket 73 independently of movement of the screw 71 to vary the limit position of the pin 90 and the temperature to which the bimetal 75 must be heated to open switch 74. This adjustment is preferably made so that the contacts will separate when the bimetal 75 reaches approximately 185° F. for a purpose to be described hereinafter. After adjustment of the sleeve 91 the latter may be locked by tightening nut 93 threaded on the sleeve against bracket 73.

The pin 90 extends radially from the axis of the adjusting screw 71 and is movable in a radial direction by an active surface 94 of a cam 95 fixed on the adjusting screw. In Fig. 6, the adjusting screw 71 and cam 95 are shown rotated to their extreme counterclockwise positions, corresponding to the "off" position of the control at the low end of the warming range. Rotation of the cam 95 in both directions is limited by engagement of a projection 96 thereon with one or the other sides of the slidable pin 90 near the end engageable with the cam surface 94. In Fig. 6, the cam surface 94 is out of engagement with the end of the slidable pin 90 and the head 92 of the latter is biased into engagement with the end of the adjusting sleeve 91 by the arm 80.

The adjusting screw 71 and cam 95 may be rotated clockwise as seen in Fig. 6 to gradually raise through a temperature range of approximately 30° F. to 260° F., the temperature of the main bimetal 58 at which switch 45 will open. The low temperature setting of 30° is substantially below normal room temperatures and, when the control knob is adjusted to this minimum or "off" setting, the bimetal 58 will maintain switch 45 open. When the adjusting screw 71 reaches approximately the 260° F. position, the cam surface 94 engages the end of the pin 90 and a slight amount of further clockwise movement of the adjusting screw will shift the slidable pin outwardly, or upwardly as seen in the drawings, to the position shown in Figs. 4 and 5. This 260° F. temperature at which shifting of the pin takes place is the beginning or low end of the range of adjustment of the control above boiling. The cam surface 94 shifts the pin 90 outwardly a sufficient amount to prevent the L-shaped bimetal 75 from deflecting sufficiently to separate the contacts 78 and 79 of the auxiliary switch 74 in response to the heating of the vessel 11. Thus, in the range of adjustments of the thermostat 41 above the boiling range, the switch 74, which shunts the auxiliary heater 85, will be locked closed and separation of the main contacts 65 and 67 of switch 45 to deenergize the main heater 13 may be effected only in response to heat received by the main bimetal 58 from the vessel itself.

The terminal member 83 and one end of the heater are connected within the chamber by an insulated electrical conductor 97. The terminal member 63 and the other end of the heater are connected by respective insulated electric wires 98 and 99 to the two male terminal members 48 in the outer end of the handle. These wires extend from the chamber 17 through the tubular member 31 and through the passage 29 in the handle. The flexible coupling 43 is connected between the adjusting screw 71 and the rotatable knob 42 and may be in the form of a flexible wire which bends to take care of any misalignment or angularity between the axis of the screw 71 and knob 42, but which prevents rotational displacement of one relative the other. Suitable indicia may be provided on the handle 24 and knob 42 to indicate the three ranges of adjustment of the control, namely warming (30° F. to 185° F.), boiling (185° F. to 260° F.) and above boiling (260° F. to 450° F.).

In describing the operation of the apparatus referred to above, a warming operation will first be discussed. After connecting the male terminals 48 to a suitable power source, the control knob 42 may be rotated to turn the adjusting screw 71 clockwise, as seen in Figs. 5 and 6, to a position in which the main switch 45 will be opened when the main bimetal reaches a preselected temperature in the range from approximately 30° F. to 185° F. The main heater 13 will thus be energized until the vessel 11 reaches the preselected temperature, at which time the switch 45 will open. The vessel will cool until the bimetal cools to permit the switch to close. Continued opening and closing of the switch 45 will take place to maintain the temperature of the vessel 11 at the desired value. Inasmuch as the adjustment of the main bimetal in the warming range from 30° F. to 185° F. prevents the vessel from exceeding the latter temperature, the auxiliary bimetal 75 will never be heated sufficiently to open the auxiliary switch 74.

For a boiling operation, the adjusting screw is rotated clockwise as seen in Fig. 6, beyond the 185° position, so that the main switch 45 will not open until the main bimetal 58 reaches a temperature above 185° F. The pin 90 remains in the position of Fig. 6, so that switch 74 will open at 185° F. For boil control, the temperature setting for the main bimetal to open switch 45 is preferably above 212° F. Since the vessel will not exceed the boiling temperature of water therein during a boiling operation, auxiliary heat must be supplied to the main bimetal in order to open the switch 45. This auxiliary heat is supplied to the main bimetal by the U-shaped heater 85 which is energized after the vessel reaches 185° F. by the opening of the shunting switch 74. The contacts of the shunting switch 74 will remain separated as long as the auxiliary bimetal 75 and the vessel 11 exceed 185° F. during a boiling operation. The main switch 45 is connected in series with both the auxiliary heater 85 and the main heater 13 so that both will be deenergized when the main bimetal 58 opens switch 45. The main bimetal 58 will then cool to close switch 45. Due to the ability of the auxiliary heater to carry the main bimetal to the temperature above the boiling point of water at which it opens switch 45, the latter will be cyclically opened and closed. The period of engagement of the contacts 65 and 67 of switch 45 relative their period of disengagement may be varied to vary the rate of boiling by rotating the adjusting screw 71 within the boiling range. Although the control, when adjusted in the boiling range, operates as a thermal cycling control, it is important to note that the cycling operation of the main bimetal 58 under the influence of the auxiliary heater 85 will not begin until the vessel 11 reaches a temperature just a few degrees below boiling, at which temperature the auxiliary bimetal separates the contacts of the switch 74 shunting the heater 85. This minimizes the time required for the contents of the vessel 11 to reach boiling.

For cooking operations at temperatures above the boil range, from approximately 260° F. to 450° F., the adjusting screw will be rotated further in clockwise direction. In this latter range, the slidable pin will be shifted outwardly, as described above, to the position of Figs. 4 and 5 to prevent the opening of the shunting switch 74 in response to heating of the vessel 11. The main bimetal 58 will open and close the main switch 45 to maintain the temperature of the vessel at any desired level within the last-mentioned range.

While the invention has been shown in but one form, it will be obvious to those skilled in the art that it is not so limited, but is susceptible of various changes and modifications without departing from the spirit thereof.

Applicant's assignee is the owner of copending application Serial No. 620,046, filed July 5, 1957, for Control for Heating Apparatus, and containing broad claims relating to the subject matter of this application.

What is claimed is:

1. A control for an electrically heated cooking vessel or the like comprising a main switch for controlling the energization of the vessel heater, a thermally responsive means for sensing the temperature of said vessel and actuating said main switch, a manually adjustable member for selecting the temperature of said thermally responsive means at which said switch is actuated, an auxiliary heater for said thermally responsive means connected in series with said switch, a thermally actuated auxiliary switch connected in circuit with said auxiliary heater to control energization thereof, means responsive to the temperature of said vessel for actuating said auxiliary switch to energize the auxiliary heater when the vessel reaches a temperature which is below the boiling temperature of water, means operable by said manually adjustable member for holding said auxiliary switch in a position to maintain said auxiliary heater deenergized, said last-mentioned means so holding the auxiliary switch when said manually adjustable member is in any of a plurality of positions for adjusting said main switch in a range of temperatures above the boiling temperature of water.

2. A thermally responsive control for an electrically heated cooking vessel or the like comprising a main switch for controlling the energization of the vessel heater, thermally responsive means for actuating said main switch in response to the temperature of said vessel, a manually adjustable member for selecting the temperature thermally responsive means for actuating said main switch is actuated, an auxiliary heater for said thermally responsive means connected in series with said main switch, an auxiliary switch connected in shunt with said auxiliary heater, means responsive to the temperature of said vessel for opening said auxiliary switch when the vessel temperature is at a value just below the boiling temperature of water, and means actuated by said manually adjustable member for holding said auxiliary switch closed when said member is adjusted in a temperature range above the boiling point of water.

3. A control for an electrically heated cooking vessel or the like comprising a main switch for controlling the energization of the vessel heater, a thermally responsive means for sensing the temperature of said vessel and actuating said main switch, a manually adjustable member for selecting the temperature of said thermally responsive means at which said switch is actuated, an auxiliary heater for said thermally responsive means connected in series with said switch, a thermally actuated auxiliary switch connected in circuit with said auxiliary heater to control energization thereof, means responsive to the temperature of said vessel for actuating said auxiliary switch to energize the auxiliary heater when the vessel reaches a temperature which is below the boiling temperature of water, means adjustable independently of said manually adjustable member for varying the vessel temperature at which the actuating means for the auxiliary switch actuates the latter, means operable by said manually adjustable member for holding said auxiliary switch in a position to maintain said auxiliary heater deenergized, said last-mentioned means so holding the auxiliary switch when said manually adjustable member is in any of a plurality of positions for adjusting said main switch in a range of temperatures above the boiling temperature of water.

4. A cooking appliance comprising a vessel, electrical heating means for heating said vessel, a switch connected in series with said heating means to control energization of the latter and including thermally responsive means for actuating said switch in response to change in vessel temperature, a manually operable member for adjusting said switch to determine the temperature of said thermally responsive means at which the latter opens said switch, an auxiliary heater for said thermally responsive means connected in series with said switch, an auxiliary switch connected in circuit with said auxiliary heater to control energization of the latter, thermally responsive means for actuating said auxiliary switch in response to change in vessel temperature, said manualy operable member being adjustable to a plurality of stations for adjusting the temperature at which said first thermally responsive means opens said first mentioned switch through first and second ranges of temperatures, said auxiliary switch being actuated by said second thermally responsive means at a predetermined temperature in said first range, and a movable member actuated by said manual adjusting member for holding said auxiliary switch closed when said adjustable member is adjusted in said second range.

5. A thermally controlled heating vessel comprising an electrical heater, a thermostatic control for said vessel secured in good heat transfer relationship to a wall thereof, said control comprising a main switch connected in series with said heater, a bimetal strip responsive to the temperature of the vessel and disposed to deflect upon heating to open said main switch, said control including a manually adjustable member engageable with said switch to adjust the vessel temperature at which said bimetal strip opens said main switch, an auxiliary electrical heater connected in series with said main switch, an auxiliary switch connected in shunt with said auxiliary heater, a second bimetal strip responsive to the temperature of said vessel for actuating said auxiliary switch, a movable member engageable with said switch, said auxiliary movable member having a first position for adjusting said auxiliary switch to be opened when said auxiliary bimetal reaches a predetermined temperature below the boiling temperature of water, said movable member having a second adjusted position for maintaining said auxiliary switch closed at all vessel temperatures below the temperature at which the main switch is adjusted to open, and means actuated by said manually adjustable member for actuating said movable member between said positions in an intermediate range of temperature adjustment of said main switch.

6. A thermally responsive control comprising a first thermally responsive switch, thermally responsive means for actuating said switch, manual adjusting means having two ranges of movement for selecting from two different ranges of temperatures the temperature of said means at which said switch will be opened, an auxiliary heater for said thermally responsive means, a second switch for controlling the energization of said heater, second thermally responsive means for actuating said second switch, an adjustable member for said second switch, said member being actuated by said manual adjusting means and having a first position in which said second switch is adjusted to open at a predetermined temperature of said second thermally responsive means and a second position in which said second switch is maintained closed, said adjustable member being actuated to one of said positions when said manual adjusting means is in one range of its movement and being actuated to the other of said positions when said manual adjusting means is in its other range of movement.

7. A thermally responsive control for a heating appliance comprising a first switch having a pair of cooperating contacts, a pair of relatively deflectible spring arms supporting said contacts for relative movement, a bimetal strip having a deflectible portion for actuating one of said arms relative the other to separate said contacts in response to heating of said strip, a heating element supported by said control in good heat transfer relationship with said bimetal strip, a second switch comprising a second pair of contacts, a second pair of relatively movable resilient arms carrying said second pair of contacts, one of said last mentioned arms being a bimetal member that is deflectible upon being heated to separate the contacts of said second switch, said second pair of arms being clamped in stacked relationship with said first mentioned arms and one end of said bimetal strip, said second pair of arms being electrically connected to the opposite ends, respectively, of said heating element so that said second switch shunts the latter, a manually adjustable member engageable with one of said first mentioned spring arms to adjust the temperature of the bimetal strip at which the latter will open said first switch, a movable member engageable with one of said second mentioned arms, and means connected to said manually adjustable member for moving said movable member between a first position in which said second switch may be opened by the bimetal member at a temperature of the latter below the boiling point of water and a second position in which said movable member actuates said second switch to prevent separation of its contacts in response to heating of the bimetal member, and means for supporting said movable member and said manually adjustable member in said control.

8. A thermally responsive control for a heating appliance comprising a first switch having a pair of relatively movable contacts, a pair of resilient arms carrying said contacts for relative movement, a bimetal strip having a deflectible portion disposed to actuate one of said arms relative the other to separate said contacts, a flat U-shaped heater having the closed portion of the U disposed opposite one face of the bimetal strip, a second switch comprising a pair of relatively movable contacts, a pair of resilient legs supporting said contacts, respectively, said legs having supporting portions clamped in a stacked arrangement on opposite sides of said U-shaped heater and being electrically connected to the opposite ends of said heater respectively, the ends of said heater being electrically separated and slightly offset in said stacked arrangement by a thin electrically insulating member, one of said legs being a bimetal member that is deflectible in response to heating to open said second switch, one of said arms being clamped in electrical contact with one of said legs in said stacked assembly, each of the other arm and the other leg having an electrical terminal clamped in electrical contact therewith in the stacked assembly and extending therefrom, a manually adjustable member engageable with one of said arms to adjust the temperature of said bimetal strip at which the latter actuates said first switch, and a movable member for adjusting said second switch, said movable member having a first position in which said second switch is adjusted so that it will open in response to heating of the bimetal member to a predetermined temperature, said movable member having a second position in which said switch is actuated to prevent its contacts from separating in response to heating of the bimetal member, adjustable means for determining the first mentioned position of said movable member, and cam means connected to said manually adjustable member for moving said movable member between said first and second positions, means for limiting the movement of said manually adjustable member in opposite directions, said cam means actuating said movable member between said first and second positions by adjustment of said manually adjustable member intermediate its limits of movement.

9. A thermally responsive control comprising a main switch having a pair of contacts, a pair of resilient arms carrying said contacts, a thermally responsive bimetal strip for actuating one of said arms relative the other to open said switch, said arms and said strip having relatively fixed supporting portions, a heater supported in good heat transfer relationship with said bimetal strip, a second switch comprising a second pair of contacts, a pair of resilient legs carrying said second pair of contacts, one of said legs being a bimetal member that is deflectible in response to being heated to open said second switch, a rotatable, manually adjustable member, said member being threaded in a relatively fixed bearing and being movable in an axial direction in response to rotation, a cam attached to said rotatable member and having an active surface, a second movable member engageable with said active surface and movable thereby in another direction, means for connecting said axially movable member and said second movable member for adjusting said main and second switches, respectively, said rotatable member having a range of rotation in which said main switch may be adjusted to open at a plurality of different temperatures of said bimetal strip, said cam engaging said second movable member to shift it between first and second positions in response to movement of said rotatable member in an intermediate portion of its range of rotation, said second movable member in its first position adjusting said second switch to be opened in response to heating of the bimetal member to a temperature which is below the boiling point of water and in its second position adjusting said switch to prevent it from opening in response to the heating of said bimetal member.

10. A thermally responsive control assembly comprising first and second switches and a common support therefore, a first bimetal member for actuating said first switch, a manually rotatable screw carried by said support for adjusting said first switch to set the temperature at which the switch is actuated by said bimetal member in response to displacement of the screw in an axial direction, a second bimetal member for actuating the second switch, a cam attached to said screw, means actuated by said cam for adjusting said second switch, said second switch being adjusted to be actuated by said second bimetal member in response to heating of the latter when the screw is adjusted throughout a predetermined lower range of temperature settings of said first-mentioned switch, said cam being constructed to actuate said second switch to maintain it closed when said screw is adjusted throughout a higher range of temperature settings of said first switch.

11. A control for a cooking vessel or the like having an electric heater, said control comprising a main switch for controlling energization of the vessel heater from a power source, a thermally responsive means for sensing the temperature of said vessel and actuating said main switch, a manually adjustable member for selecting from two temperature ranges the temperature of said thermally responsive means at which said switch is actuated, an auxiliary heater for said thermally responsive means connected in series with said switch, an auxiliary switch connected in circuit with said auxiliary heater and actuated when the vessel attains a predetermined temperature to energize the auxiliary heater, and means operable by said manually adjustable member for holding said auxiliary switch in a position to maintain the auxiliary heater deenergized, irrespective of said vessel attaining said predetermined temperature, said last-mentioned means so holding the auxiliary switch when said manually adjustable member is adjusted to one of said ranges.

12. A control for a cooking vessel or the like having an electric heater, said control comprising a main switch and an auxiliary heater, means for serially connecting said switch and auxiliary heater to a power source in series with the vessel heater, an auxiliary switch connected to shunt said auxiliary heater, thermally responsive means for sensing the temperature of said vessel and actuating said switches, said auxiliary heater supplying heat to said thermally responsive means in addition to the heat received thereby from the vessel when said main switch is closed and said auxiliary switch is open, a manually adjustable member for selecting from a range of temperatures the temperature of said thermally responsive means at which said main switch is opened, said auxiliary switch being opened in response to said vessel attaining a predetermined temperature below the boiling temperature of water, and means actuated by said manually adjustable member for holding said auxiliary switch closed even when the vessel exceeds said predetermined temperature, said last-mentioned means being actuated to hold the auxiliary switch closed when said manually adjustable member is in any of a plurality of positions for adjusting said main switch in a range of temperatures above the boiling temperature of water.

References Cited in the file of this patent

UNITED STATES PATENTS

| 1,680,398 | Thomas | Aug. 14, 1928 |
| 2,005,584 | Heyroth | June 18, 1935 |
| 2,409,420 | Clark | Oct. 15, 1946 |
| 2,410,013 | Clark | Oct. 29, 1946 |
| 2,611,855 | Turner | Sept. 23, 1952 |
| 2,744,995 | Jepson | May 8, 1956 |

UNITED STATES PATENT OFFICE
CERTIFICATE OF CORRECTION

Patent No. 2,847,554                           August 12, 1958

John W. Huffman

It is hereby certified that error appears in the printed specification of the above numbered patent requiring correction and that the said Letters Patent should read as corrected below.

Column 6, line 40, after "temperature" insert -- of said --; line 41, after "means" strike out "for actuating" and insert instead -- at which --; column 7, line 16, for "manualy" read -- manually --.

Signed and sealed this 11th day of November 1958.

(SEAL)
Attest:

KARL H. AXLINE
Attesting Officer

ROBERT C. WATSON
Commissioner of Patents